United States Patent
Ryan, Jr. et al.

(10) Patent No.: US 7,925,537 B2
(45) Date of Patent: *Apr. 12, 2011

(54) METHOD FOR COLLECTING SALES AND/OR USE TAXES ON SALES THAT ARE MADE VIA THE INTERNET AND/OR CATALOG

(75) Inventors: Frederick W. Ryan, Jr., Oxford, CT (US); Michael W. Wilson, Trumbull, CT (US); Ronald P. Sansone, Weston, CT (US); Theresa Biasi, Shelton, CT (US); Vadim Stelman, Trumbull, CT (US); Kathleen A. Bishop, Wilton, CT (US)

(73) Assignee: Pitney Bowes Inc., Stamford, CT (US)

(*) Notice: Subject to any disclaimer, the term of this patent is extended or adjusted under 35 U.S.C. 154(b) by 694 days.

This patent is subject to a terminal disclaimer.

(21) Appl. No.: 11/944,775

(22) Filed: Nov. 26, 2007

(65) Prior Publication Data

US 2008/0077513 A1    Mar. 27, 2008

Related U.S. Application Data

(63) Continuation of application No. 09/634,041, filed on Aug. 8, 2000.

(51) Int. Cl.
*G06Q 20/00* (2006.01)
(52) U.S. Cl. ............................. 705/19; 705/31
(58) Field of Classification Search .................. None
See application file for complete search history.

(56) References Cited

U.S. PATENT DOCUMENTS

| | | | |
|---|---|---|---|
| 4,750,119 A | 6/1988 | Cohen et al. | |
| 5,193,057 A | 3/1993 | Longfield | |
| 5,335,169 A * | 8/1994 | Chong | 705/31 |
| 5,345,595 A * | 9/1994 | Johnson et al. | 455/410 |
| 5,509,064 A | 4/1996 | Welner et al. | |
| 5,644,724 A | 7/1997 | Cretzler | |
| 5,646,389 A | 7/1997 | Brauman et al. | |
| 5,799,283 A | 8/1998 | Francisco et al. | |
| 5,875,433 A * | 2/1999 | Francisco et al. | 705/26 |
| 5,903,876 A | 5/1999 | Hagemier | |
| 5,968,110 A | 10/1999 | Westrope et al. | |
| 5,995,625 A | 11/1999 | Sudia et al. | |
| 6,016,479 A | 1/2000 | Taricani, Jr. et al. | |
| 6,038,548 A | 3/2000 | Kamil | |
| 6,041,317 A | 3/2000 | Brookner | |
| 6,078,898 A | 6/2000 | Davis et al. | |
| 6,078,899 A * | 6/2000 | Francisco et al. | 705/19 |
| 6,085,324 A | 7/2000 | Ogram | |
| 6,141,650 A | 10/2000 | Iwasa et al. | |
| 6,192,473 B1 | 2/2001 | Ryan et al. | |
| 6,199,049 B1 | 3/2001 | Conde et al. | |
| 6,202,052 B1 | 3/2001 | Miller | |
| 6,223,187 B1 | 4/2001 | Boothby et al. | |
| 6,311,171 B1 | 10/2001 | Dent | |
| 6,321,256 B1 | 11/2001 | Himmel et al. | |
| 6,697,787 B1 | 2/2004 | Miller | |
| 2003/0040992 A1 * | 2/2003 | Ryan et al. | 705/31 |

* cited by examiner

Primary Examiner — F. Zeender
Assistant Examiner — Christopher Buchanan
(74) Attorney, Agent, or Firm — Brian A. Lemm; Charles R. Malandra, Jr.

(57) ABSTRACT

A method that allows taxing jurisdictions to collect sales and/or use taxes from sales that are made via the internet and catalogs. The method also makes it easier for sellers to comply with the taxing jurisdiction's mandated seller administrative functions. The foregoing is accomplished by using an agent to perform the sales tax administration functions of a seller, relieving the seller of as much of the burden of compliance as possible.

14 Claims, 2 Drawing Sheets

METHOD FOR COLLECTING SALES AND/OR USE TAXES ON SALES THAT ARE MADE VIA THE INTERNET AND/OR CATALOG

CROSS REFERENCE TO RELATED APPLICATIONS

This is a continuation of application Ser. No. 09/634,041 filed Aug. 8, 2000. Reference is made to commonly assigned copending patent application Ser. No. 09/634,040 filed Aug. 8, 2000, entitled "Method For Obtaining Secure Receipts For Sales and/or Use Taxes That Are Made Via The Internet and/or Catalog" in the name of Frederick W. Ryan, Jr.

FIELD OF THE INVENTION

This invention pertains to commercial transactions and, more particularly, to the collection of taxes for the sale and/or use of goods and/or services.

BACKGROUND OF THE INVENTION

From the dawn of history to the present day, governments have collected taxes to pay for the government's expenditures. One type of tax levied by governments is tax on the sale and/or use of goods and/or services. "Sales taxes" are usually imposed at a certain percent of the receipts from every retail sale of tangible personal property made in the taxing jurisdiction. "Use taxes" are usually imposed on the use of tangible personal property or taxable services within the taxing jurisdiction.

Currently, in the United States, some cities, states, counties, districts, and boroughs collect sales and/or uses taxes on commercial transactions that take place in their jurisdictions. In fact, there are approximately 6,000 jurisdictions in the United States collecting sales and/or use taxes. The sales and/or use taxes are at many different rates and apply to different types of goods and/or services. For instance, the sales tax on clothing may be exempt from taxation in one jurisdiction and subject to taxation in another jurisdiction at a rate of 6% for all clothing sales over $100.00. The sales tax may also be based upon the amount of the substance that is contained in the product, i.e., juices having different amounts of concentrates are taxed at different rates in some jurisdictions. Some entities, like charities, Indian tribes, etc. may be subject to taxation in one jurisdiction and not in another.

Generally, a jurisdiction has the right or power to tax a commercial transaction if the commercial transaction takes place within the taxing jurisdiction, i.e., goods subject to a sales tax are sold by a store that is physically located within the taxing jurisdiction. Goods subject to a use tax are goods that are used, consumed or stored in the taxing jurisdiction. The taxing jurisdictions usually have no difficulty collecting sales taxes on sales in their taxing jurisdiction made by merchants physically located in the taxing jurisdiction. A buyer is responsible for the payment of the tax if the seller does not collect the tax. However, the taxing jurisdictions usually find it difficult to collect taxes on the sale and/or use of goods and/or services that are made in a different jurisdiction and delivered and/or performed in the taxing jurisdiction. There has been a tremendous increase in the number of commercial transactions that are or may be subject to a sales and/or use tax that are taking place over the internet or from catalogs. The taxing jurisdictions are having difficulty collecting sales and/or use taxes that are made via the internet and catalogs.

Currently, sellers of goods and/or services have difficulty complying with the sales and/or use tax government mandated seller administrative functions. Sales tax administration functions include determination and calculation of the amount of tax due, collection of the tax, remittance of the tax, and filing reports of the tax to the appropriate governmental agency. The seller of the goods/and or services also has to maintain adequate records since the government may audit the seller.

In existing tax collection systems, a representative of a taxing jurisdiction must physically visit a seller in order to audit the seller. As a result, the seller, to some degree, can control the amount of information and content of information to which any given taxing jurisdiction has access. For example, a seller may not show the taxing jurisdiction all of the relevant information or the taxing jurisdiction may view information that it is not entitled to view.

SUMMARY OF THE INVENTION

Today, sellers are responsible for calculating taxes due based upon the location of the buyer, collecting taxes due from the buyer, accounting for taxes collected for the taxing jurisdiction, remitting taxes to the taxing jurisdiction for which they were collected, filing tax returns with each taxing jurisdiction for which taxes have been collected and supporting each taxing jurisdiction's audit of the buyer's records.

This invention overcomes the disadvantages of the prior art by providing a method that allows taxing jurisdictions to collect sales and/or use taxes on sales that are made via remote sales i.e., via the internet and/or catalogs, etc. The invention also makes it easier for sellers to comply with the taxing jurisdiction's mandated seller administrative functions. The foregoing is accomplished by using an agent to perform the sales tax administration functions of a seller, thereby relieving the seller of as much of the burden of compliance as possible.

Buyer and seller privacy are increased by segmenting seller and taxing jurisdiction data bases and by implementing a mechanism to provide buyers and sellers with a receipt of taxes paid. Sellers are provided with a mechanism to inspect the tax records maintained by the agent. The taxing jurisdictions are able to identify potentially fraudulent seller behavior, while limiting their access to named seller tax collection records. The invention also has the ability to provide tax remittance financing to sellers.

Currently, audits must be coordinated between the taxing jurisdiction performing the audit and the seller being audited. This invention eliminates the need for the above type of coordination, and it also enables the taxing jurisdictions to audit sellers without the seller's prior knowledge or consent. The sellers may be given some control over the taxing jurisdiction's unsupervised access into their records. The invention may give sellers varying degrees of control over the taxing jurisdiction's access to their records, by allowing the taxing jurisdictions access to seller data only after the seller has been able to review the data. Prior to the taxing jurisdiction's review of a seller's records, a message would be sent to the seller (e.g., via email or an email service with receipt confirmation such as Pitney Bowes iSend™ product). After the seller either grants permission to the taxing jurisdiction or a specified time period passes (e.g., seven days), the taxing jurisdiction would be allowed to view the detailed records. This would enable a seller to review the records and resolve any issues prior to a taxing jurisdiction's audit. Alternatively, a seller may be informed after a taxing jurisdiction reviewed seller's records.

The invention may also restrict the taxing jurisdiction's access to a seller's records to a limited number of times over a given period of time (e.g., three times every five years).

DETAILED DESCRIPTION OF THE PREFERRED EMBODIMENT

Figure 1:
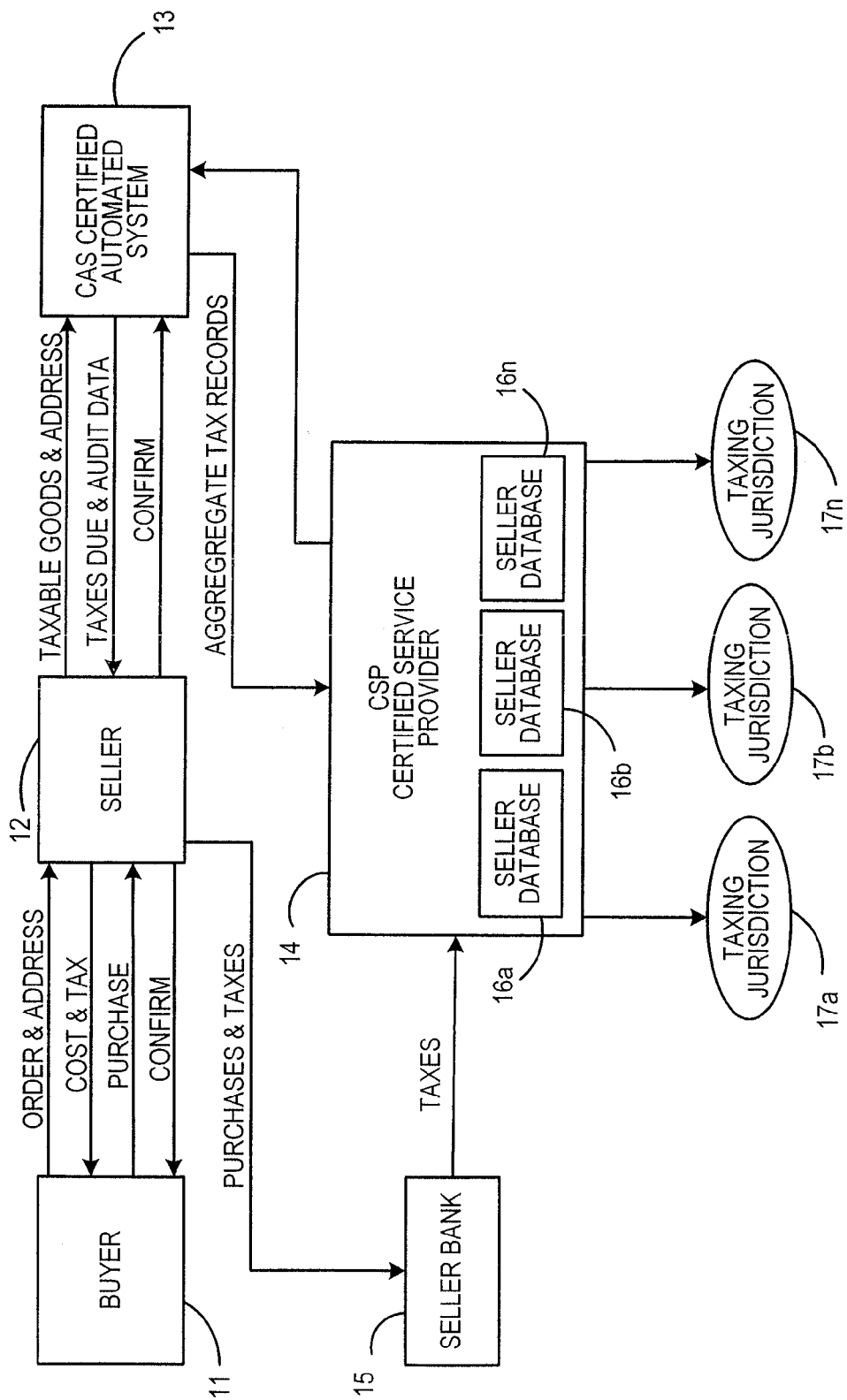
FIG. 1 is a drawing of a Streamlined Sales and Use Tax System.

Referring now to the drawings in detail, and more particularly to FIG. 1, the reference character 11 represents a plurality of buyers who purchase goods and/or services from a plurality of sellers 12. The remote sale may be via the internet and/or catalog, etc. The information exchanged between buyer 11 and seller 12 and seller 12 and buyer 11 may be: the particulars of the sales order and/or service; the location of the buyer; the cost of the sales order and/or service, including any sales or use tax that may be due; acceptance of the order by seller 12, and confirmation of the order by buyer 11. It will be obvious to one skilled in the art that buyer 11 and seller 12 may transmit other information, i.e., more specific location information, buyer exemption information, buyer identification number, etc. Seller 12 may transmit the location of buyer 11, the items and/or services to be purchased by buyer 11, the classification of the items and/or services to be purchased by buyer 11 and the cost of the items and/or services purchased by buyer 11 to certified automated system (CAS) 13. Seller 12 receives from CAS 13 the amount of taxes due on the sale. CAS 13 has been certified by the taxing jurisdictions and must comply with the taxing jurisdiction's rules and regulations to maintain its certification. CAS 13 maintains a log of all sales and/or use tax transactions. CAS 13 transmits the aggregate tax records, i.e., a log of all sales and/or use tax transactions to certified service provider (CSP) 14. CAS 13 calculates the tax and transmits the amount of taxes that are due to seller 12. CSP 14 has been certified by the taxing jurisdictions and must comply with the taxing jurisdiction's rules and regulations to maintain its certification.

Periodically, seller 12 will transmit the monies it receives from buyer 11 to seller bank 15. Bank 15 will periodically send the taxes that are due to CSP 14. CSP 14 will set up tax record data bases 16a, 16b . . . 16n for each seller 12 in each taxing jurisdiction 17a, 17b, . . . 17n. CSP 14 will aggregate the payments that are due to taxing jurisdictions 17a, 17b, . . . 17n, prepare documentation, (tax returns) for taxing jurisdictions 17a, 17b, . . . 17n submit documentation to taxing jurisdictions 17a, 17b, . . . 17n, submit tax revenues to jurisdictions 17a, 17b, . . . 17n and support taxing jurisdictions 17a, 17b, . . . 17n when they audit buyer 11. CSP 14 can restrict taxing jurisdictions 17a, 17b, . . . 17n access to data while still enabling complete disclosure of information in the support of tax audits. This is accomplished by separating the data received from the CAS 13 into several separate seller tax record data bases 16a, 16b, . . . 16n and restricting access to those seller tax record data bases 16a, 16b, . . . 16n. Separate seller tax record data bases 16a, 16b, . . . 16n exist for each taxing jurisdictions 17a, 17b, . . . 17n.

Taxing jurisdictions 17a, 17b, . . . 17n will receive: all the transactions for which taxes are due the taxing jurisdictions, all transactions in which taxes would normally be due the taxing jurisdictions but for which an exemption has been claimed, all tax returns generated and filed by CSP 14 with taxing jurisdictions 17a, 17b, . . . 17n, and a log of all financial transactions with taxing jurisdictions 17a, 17b, . . . 17n. Taxing jurisdictions 17a, 17b, . . . 17n are restricted from viewing each other's data bases. In addition, sellers stored in seller tax record data bases 16a, 16b, . . . 16n may be stored with an alias (e.g., a buyer ID number) which is not normally exposed to taxing jurisdictions 17a, 17b, . . . 17n. Taxing jurisdictions 17a, 17b, . . . 17n could audit seller tax record data bases 16a, 16b, . . . 16n and tax return information based upon seller ID number. A seller's identity would be disclosed to a taxing jurisdiction 17a, 17b, . . . 17n only if there were sufficient suspicion of fraud based upon audit data. The foregoing may also be done for buyers 11.

A seller 12 may view the contents of his/her seller tax record data bases 16a, 16b, . . . 16n. A seller tax record data base 16a, 16b, . . . 16n contains: a record of all transactions the seller has conducted, a record of all tax returns filed by CSP 14 on behalf of the seller 12, a record of all financial transactions with the seller 12, and a record of audits performed by taxing jurisdictions 17a, 17b, . . . 17n.

CAS 13 may be the sales tax software sold by Taxware International, Inc. of 27 Congress Street, Salem, Mass. 01970, or the sales tax software sold by VERTEX, INC., of 1041 Old Cassat Road, Berwyn, Pa. 19312, or other similar software and/or system.

CSP 14 is an agent certified by taxing jurisdictions 17a, 17b, . . . 17n. CSP 14: determines the total amount of taxes due to each taxing jurisdiction; pays the taxes to taxing jurisdictions 17a, 17b, . . . 17n; and files tax returns with taxing jurisdictions 17a, 17b, . . . 17n in cooperation with CAS 13 on behalf of sellers 12. CSP 14 also allows taxing jurisdictions 17a, 17b, . . . 17n to audit sellers 12. CSP 14 may be an automated computer system which performs data processing and financial transactions.

Figure 2:
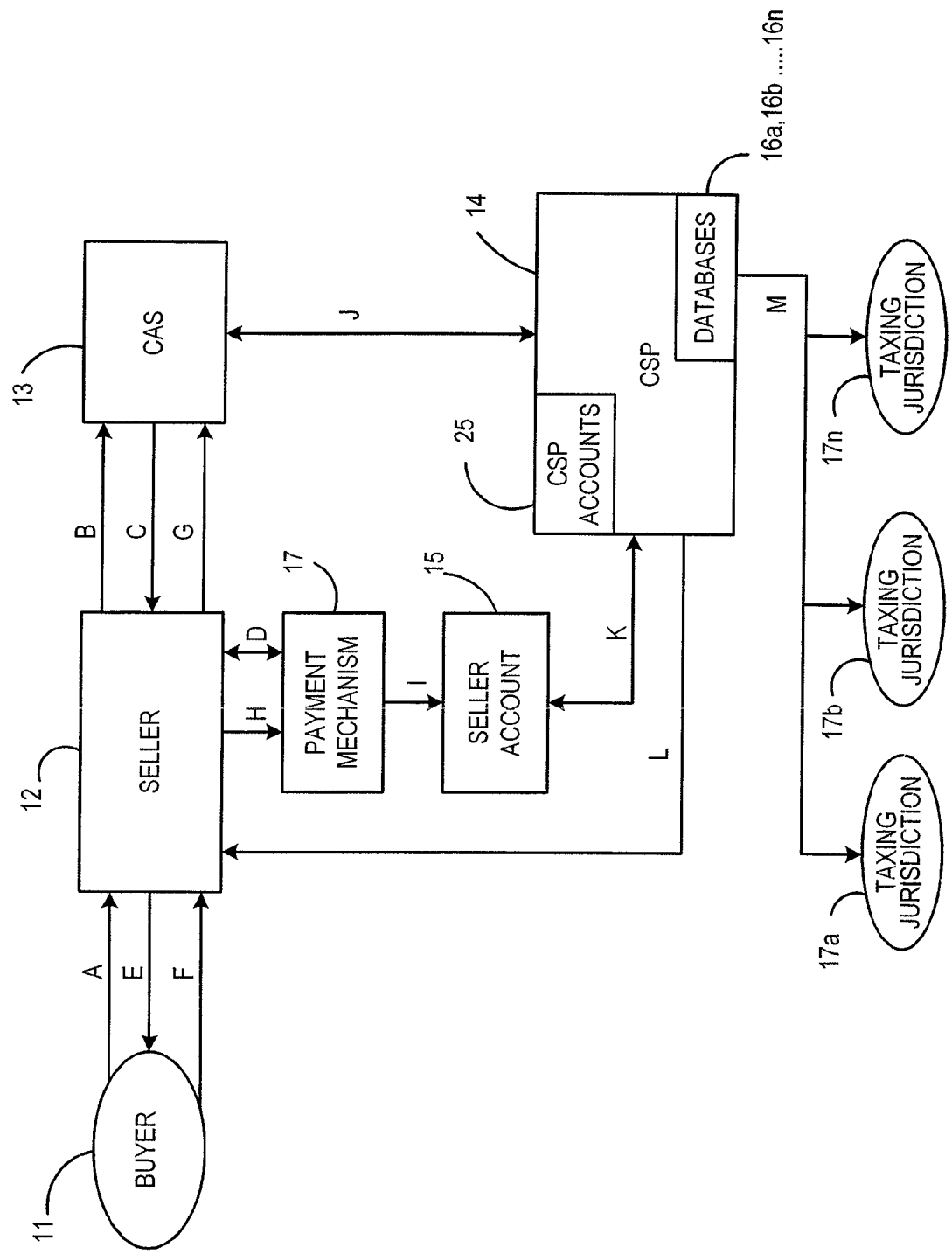
FIG. 2 is a drawing showing the transaction flow of the system described in FIG. 1.

FIG. 2 is a drawing showing the transaction flow of the system described in FIG. 1. The transaction begins when buyer 11 requests to purchase goods and/or services from seller 12 via A. Then seller 12 collects buyer information, including tax data, i.e., location, exemption status, from buyer 11. Seller 12 sends itemized purchase and buyer tax information to CAS 13 via secure connection B. Now CAS 13 calculates applicable taxes. At this point CAS 13 sends the result of the tax calculation to buyer 12 via C. If necessary, seller 12 verifies payment availability (e.g., credit card approval, line of credit check, etc.) from payment mechanism 17 via D. Then seller 12 presents a finalized statement to buyer 11 and requests confirmation of the sale via E. Then buyer 11 confirms the sale via F. Then seller 12 confirms the sale to CAS 13 via G. CAS 13 records all transactions conducted with seller 12 and stores the transactions as tax data. Seller 12 confirms the sale to payment mechanism 17 (credit card, line of credit, etc.) via H. Then funds for the total amount of the sale are transferred to seller bank 15 via I. CAS 13 will periodically send tax data to CSP 14 via a secure connection J. Based upon the tax data received from CAS 13, CSP 14 aggregates the taxes collected by seller 12 into seller tax record data bases 16a, 16b, . . . 16n. CSP 14 periodically initiates a electronic funds transfer transaction to transfer taxes collected by seller 12 from seller account 15 to CSP account 25, based upon data in tax record data bases 16a, 16b, . . . 16n. CSP 14 sends a statement of the tax collected to seller 12 via L. CSP 14 periodically sends tax returns and other information to taxing jurisdictions 17a, 17b, . . . 17n via M and initiates electronic funds transactions transfer of funds from CSP account 25 to taxing jurisdictions 17a, 17b, 17n via M.

Taxing jurisdictions 17a, 17b, . . . 17n may be able to audit seller tax record data bases 16a, 16b, . . . 16n without the seller's prior knowledge or consent. Sellers 12 may be given some control over taxing jurisdictions 17*a*, 17*b*, . . . 17*n* (unsupervised) access into the seller's records. For instance, taxing jurisdictions 17*a*, 17*b*, . . . 17*n* may have access only to data bases 16*a*, 16*b*, . . . 16*n* data and only after seller 12 has been able to review the data. Prior to taxing jurisdictions 17*a*, 17*b*, . . . 17*n* review of a seller's tax record data bases 16*a*, 16*b*, . . . 16*n*, a message would be sent to seller 12 (e.g., via email or an email service with receipt confirmation such as Pitney Bowes iSend™ product). After seller 12 either grants permission to a taxing jurisdiction 17*a*, 17*b*, . . . 17*n* or a specified time period passed (e.g., 7 days), a taxing jurisdiction 17*a*, 17*b*, . . . 17*n* would be allowed to view a seller's tax record data bases 16*a*, 16*b*, . . . 16*n*. This would enable a seller 12 to review the seller's tax record data bases 16*a*, 16*b*, . . . 16*n* and resolve any issues prior to a taxing jurisdictions 17*a*, 17*b*, . . . 17*n* audit. Alternatively, a seller 12 may be informed after a taxing jurisdiction 17*a*, 17*b*, . . . 17*n* reviewed the seller's tax record data base 16*a*, 16*b*, . . . 16*n*.

The invention may also restrict a taxing jurisdiction's 17*a*, 17*b*, . . . 17*n* access to a seller's tax record data base 16*a*, 16*b*, . . . 16*n* to a limited number of times over a given period of time (e.g., three times every five years).

Taxing jurisdictions 17*a*, 17*b*, . . . 17*n* may identify potentially seller 12's fraudulent behavior by having CSP 14 run various checks of the behavior of seller 12. These checks would be accomplished by processing data in a seller's tax record data base 16*a*, 16*b*, . . . 16*n* received from CAS 14. The aforementioned checks would include: identifying a strange drop-off in the number of seller transactions in a tax record data base 16*a*, 16*b*, . . . 16*n*. For example, by looking at a history of seller 12 transactions over a significant period of time to determine seller trends and identify changes in the trends (e.g., there would be an expected drop-off in sales in January, which would not be considered potentially fraudulent behavior, whereas a drop in sales in December may be considered potentially fraudulent behavior).

CSP 14 also may compare the transaction volume, dollar volume and transaction types relative to other similar sellers (e.g., if most sellers 12 in a given seller class claim 15% exempt transactions and a single seller claims 70% exempt transactions potential fraud would be flagged). Identifying an inordinate number of cancelled transactions in sellers tax record data base 16*a*, 16*b*, . . . 16*n* may indicate that a seller 12 is charging buyers 11 sales and/or use tax and then informing CAS 14 that buyers 11 are canceling the transaction.

It is desirable that certain "watermarks" be established for types of businesses that have the same frequency of cancelled sales, since businesses may profit by canceling a sale for which a seller has collected taxes from a buyer, and the seller has not returned the taxes collected for the sale to the buyer. CAS 14 may establish watermarks by identifying an inordinate amount of returned goods for a particular type of business. CAS 14 may also identify patterns that indicate a seller repeatedly requests taxes due from CAS 14 for a large sale with several items and modifies the sale by replacing the higher priced items with lower priced items, etc.

The above specification describes a new and improved method for taxing jurisdictions to collect sales and/or use taxes from internet and catalog sales. It is realized that the above description may indicate to those skilled in the art additional ways in which the principals of this invention may be used without departing from the spirit. Therefore, it is intended that this invention be limited only by the scope of the appended claims.

What is claimed is:

1. A method for collecting sales and/or use taxes on remote sales made via a network from a seller to buyers, said method comprising:
   collecting, by a processing device associated with the seller that is coupled to the network, information regarding remote sales made to buyers by the seller via the network;
   using by the processing device the collected information to calculate a taxing jurisdictions sales and/or use tax to be paid by the buyers for the remote sales and transmitting the calculated taxing jurisdictions sales and/or use tax and collected information to a computer system;
   segmenting, by the computer system, the transmitted sales and/or use taxes and collected information for respective taxing jurisdictions into different databases for each taxing jurisdiction, wherein the identity of the seller is not revealed to the taxing jurisdiction and each taxing jurisdiction may only view its own database if there is a suspicion of fraud based upon audit data; and
   aggregating, by the computer system, tax payments due to each taxing jurisdiction and transferring funds, on behalf of the seller, for the tax payments received by the seller from the buyers to each taxing jurisdiction.

2. The method claimed in claim 1, wherein a buyer is given a receipt for the tax payments made by the buyer.

3. The method claimed in claim 1, wherein the collected information is also segmented for each buyer.

4. The method claimed in claim 1, further comprising:
   preparing, by the computer system, reports for the taxing jurisdictions for the tax payments due.

5. The method claimed in claim 1, further comprising:
   preparing, by the computer system, a report for the seller for the tax payments due.

6. The method claimed in claim 1, further comprising:
   preparing, by the computer system, tax returns for the seller with the taxing jurisdictions for the tax payments due.

7. The method claimed in claim 1, further comprising:
   providing financing to the seller to pay the sales and/or use taxes that are due.

8. The method claimed in claim 1, wherein the collected information segmented by the computer system may be accessed by an identification number.

9. The method claimed in claim 1, wherein a taxing jurisdiction may access the collected information segmented by the computer system for that jurisdiction with an identification number.

10. The method claimed in claim 9, wherein the computer system reveals the identity of the seller if the segmented information identifies improper conduct.

11. The method claimed in claim 9, further comprising:
    notifying the seller that a taxing jurisdiction is studying its collected information.

12. The method claimed in claim 11, wherein a seller may review the collected information before the taxing jurisdiction studies the collected information.

13. The method claimed in claim 9, wherein a taxing jurisdiction will be able to access the collected information that is segmented by the computer system only after specified time period has passed.

14. The method claimed in claim 1, wherein the taxing jurisdictions pay for services rendered by the computer system.

* * * * *